United States Patent

Normile

[11] Patent Number: 6,028,965
[45] Date of Patent: Feb. 22, 2000

[54] METHOD AND APPARATUS FOR INTELLIGENT CODEC SYSTEM

[75] Inventor: James Oliver Normile, Woodside, Calif.

[73] Assignees: LG Electronics, Inc, San Jose; James Normile, Woodside, both of Calif.

[21] Appl. No.: 08/855,460

[22] Filed: May 13, 1997

[51] Int. Cl.[7] .............................. G06K 9/36; G06K 9/46
[52] U.S. Cl. .................. 382/250; 382/236; 382/239; 348/419
[58] Field of Search ...................... 382/239, 236, 382/250, 260; 348/419, 404, 407

[56] References Cited

U.S. PATENT DOCUMENTS 5,719,962  2/1998  Sugahara et al. ................ 382/239
5,832,125  11/1998  Reese et al. ..................... 382/239

*Primary Examiner*—Phuoc Tran
*Attorney, Agent, or Firm*—Peninsula Law Group; Daniel Hopen

[57] ABSTRACT

A system for encoding and decoding data blocks and methods of operating the same result in an encoder that provides intelligent data rate control. The encoder comprises DCT (discrete cosine transformer) resources having a truncate controller configured to receive a truncate signal to truncate the data blocks to provide reduced data blocks. Quantizing resources is coupled to the DCT resources to quantize the reduced data blocks to provide quantized data blocks. Inverse quantizing resources is coupled to the quantizing resources to inverse quantize the quantized data blocks. Frame reconstruction resources is coupled to the inverse quantizing resources to reconstruct previous compressed frames. Motion estimation resources is coupled to the frame reconstruction resources to provide predicted data blocks. Subtraction resources is coupled to the DCT resources and the motion estimation resources to subtract the data blocks and the predicted data blocks. An output data buffer is coupled to the quantizing resources and the inverse quantizing resources configured to provide previous compressed image data in response to an update request while maintaining a particular target data rate to the decoder.

15 Claims, 7 Drawing Sheets

METHOD AND APPARATUS FOR INTELLIGENT CODEC SYSTEM

BACKGROUND OF THE INVENTION

1. Field of the Invention

The present invention relates to encoding and decoding of video images and more particularly to manipulating parameters of an encoding engine to minimize impact on encoded data rates while servicing update requests for retransmission of lost data.

2. Description of the Related Arts

As the Internet becomes more and more popular, more and more data are being transferred using the Internet. The internet and other channels of communication have bandwidth limitations. Data compression is often used to maximize data transmission over such limited bandwidth channels. Most people access the Internet using fixed rate channels such as telephone lines. The fixed rate channels present problems for viewing video. Typically, as video images are compressed, the video compression process generates a variable data rate over time. The variable data rate is undesirable for fixed rate channels and often causes jittery video images at the receiver.

Furthermore, transmission errors often occur whenever data is transferred over a lossy medium such as a telephone line as is the case when images are encoded as compressed data sent over the telephone line or other network and decoded to reveal the original images. When decoded erred images cannot be ignored through error correction techniques or interpolation of surrounding images, retransmission of the erred images are needed for smooth video images. However, retransmission of erred images increases the amount of compressed data for a codec (encoding and decoding) system. Not only is there compressed data from encoded incoming images, there is also compressed data from retransmission of the erred data. Increasing the overall data rate may also produce undesirable effects to the video images at the receiver. In current systems lost data results in the need to transmit an intra frame to refresh the decoded image. Intra frames require 3–5 times the bandwidth usually allowed per frame. Frequent transmission of intra frames results in a significant reduction in frame rate and an inability to represent motion in the input images.

Therefore, it is desirable to provide an apparatus and methods of operating the same which maintains a target data rate while servicing update request for retransmission of erred images.

SUMMARY OF THE INVENTION

The present invention provides an apparatus for intelligent encoders and methods for operating the same which result in improved efficiency for transferring compressed images. The novel video encoder is based on altering parameters of various components of the encoding engine. Thus, according to one aspect of the invention, the video encoder for encoding input images having a plurality of data blocks to provide output image data comprises DCT (discrete cosine transformer) resources having a truncate controller configured to receive a truncate signal to truncate the data blocks to provide reduced data blocks. Quantizing resources is coupled to the DCT resources to quantize the reduced data blocks to provide quantized data blocks. Inverse quantizing resources is coupled to the quantizing resources to inverse quantize the quantized data blocks. Frame reconstruction resources is coupled to the inverse quantizing resources to reconstruct previous compressed frames. Motion estimation resources is coupled to the frame reconstruction resources to provide predicted data blocks. Subtraction resources is coupled to the DCT resources and the motion estimation resources to subtract the data blocks and the predicted data blocks. An output data buffer is coupled to the quantizing resources and the inverse quantizing resources configured to provide the compressed image data and respond to update requests of previous compressed image data while maintaining a particular target output of compressed image data rate.

According to another aspect of the invention, the output data buffer includes resources configured to predict output image data rate consequences from providing the previous compressed image data. The output processor maintains a particular target output of the compressed image data rate so that the increased retransmitted compressed image data does not increase the data rate beyond the particular target output data rate.

Pre-filtering resources coupled to the subtraction resources and the data rate controller pre-filter the data blocks in response to the output processor for reducing the output image data rate. DCT resources coupled to the subtraction resources, quantizing resources, and the data rate controller pre-quantize DCT coefficients of the data blocks in response to the output processor for reducing the output image data rate. Modified motion estimation resources coupled to the subtraction resources, frame reconstruct resources, and the output processor set motion estimation preference of the data blocks in response to the output processor for reducing the output image data rate.

According to yet another aspect of the invention, the output processor includes logging resources which logs the update requests. The output processor in response to repeated update requests reduces the output image data rate. The output processor includes resources which provide a pre-filter intra frame signal to the pre-filtering resources to provide a pre-filtered intra frame. The output processor also includes an output cache which enables the output processor to efficiently service the update requests.

An apparatus and method for operating an intelligent encoder are provided whereby the intelligent encoder predicts data rate consequences of retransmitting intra frame data along with incoming image data and adjusts encoding parameters for the incoming image data so as to maintain a particular target bit rate. Improved encoding performance is achieved through reducing the number of encoded data bits during update requests for retransmission of erred images. Furthermore, maintaining the particular target bit rate improves appearance of decoded images.

Other aspects and advantages of the present invention can be seen upon review of the figures, the detailed description, and the claims which follow.

DETAILED DESCRIPTION OF THE INVENTION

Figure 1:
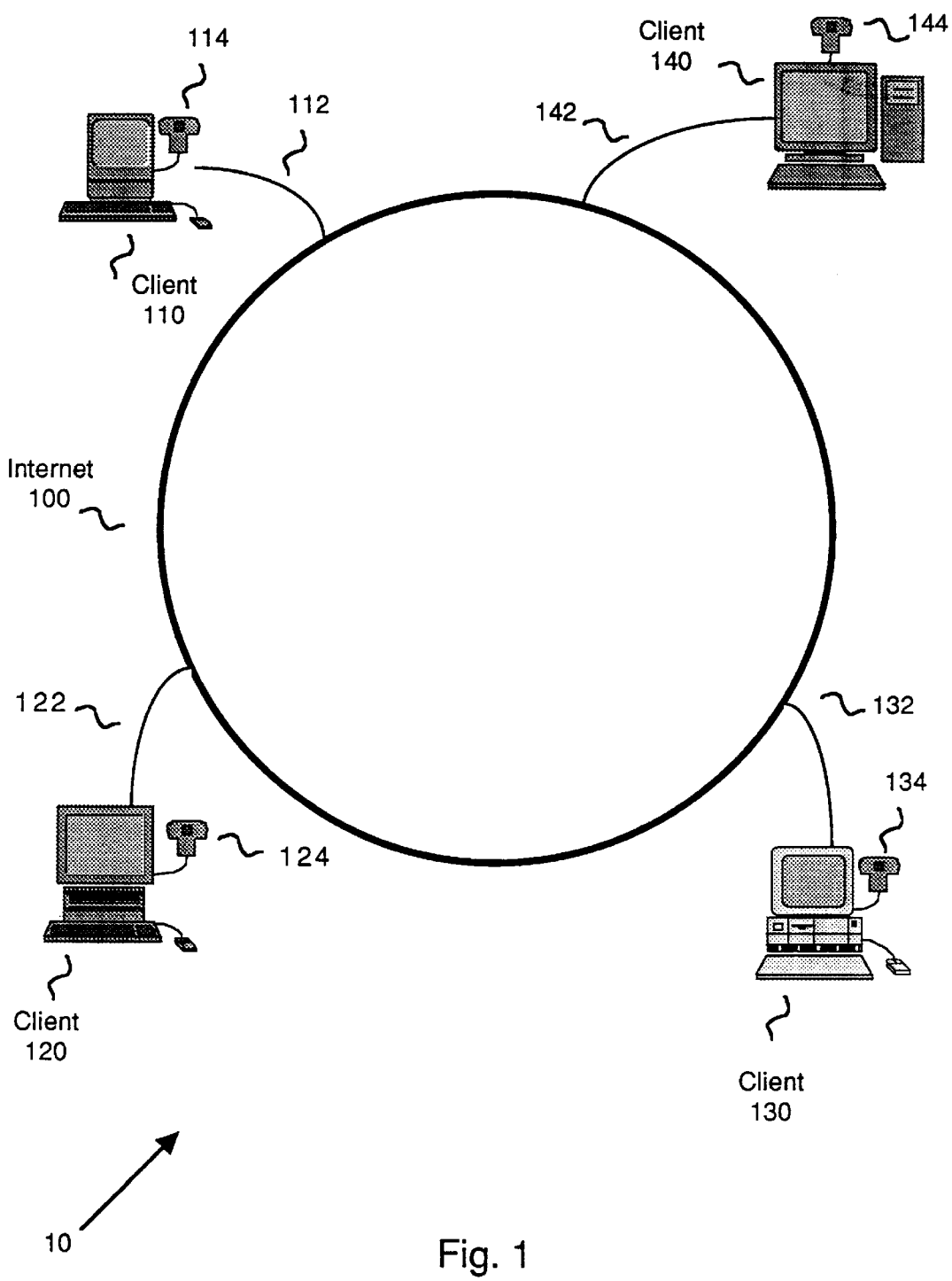
FIG. 1 illustrates a system level block diagram of a video conferencing system.

The invention will be described with respect to the Figures in which FIG. 1 generally shows a video conferencing system 10. The video conferencing system 10 includes an Internet 100, client 110, client 120, client 130, and client 140. The Internet 100 provides TCP/IP (Transmission Control Protocol over Internet Protocol). Other represented segments operating the TCP/IP including intranets, local area, and telephone networks are also suitable.

Network connection 112 provides the client 110 access to the Internet 100. Network connection 122 provides the client 120 access to the Internet 100. Network connection 132 provides the client 130 access to the Internet 100. Network connection 142 provides the client 140 access to the Internet 100. Clients 110, 120, 130, and 140 include logic circuits that are programmed to perform a series of specifically identified operations for video conferencing on the Internet 100. Video camera 114 provides audio/video data from client 110 for transfer to another client on the Internet 100. Client 140 for example, is configured to receive the audio/video data from client 110 and transfers the audio/video data from camera 144 to client 110 on the Internet 100. Similarly, client 120 includes camera 124, and client 130 includes camera 134 for video conferencing on the Internet 100. Thus, clients 110, 120, 130, and 140 include video conferencing links via the Internet 100 to provide video conferencing between the clients.

The clients 110, 120, 130, and 140 include logic circuits that are programmed to perform a series of specifically identified operations for encoding and decoding compressed bitstream video data. Video encoding techniques such as H.261 and H.324 standards have been developed for use in video teleconferencing and video telephony applications and provide a plurality of display frames wherein each display frame includes a plurality of display blocks.

For example, each picture is divided into groups of blocks (GOBs). A group of blocks (GOB) includes multiples of 16 lines depending on the picture format. Each GOB is divided into macroblocks. A macroblock relates to 16 pixels by 16 pixels of y, the luminance, and the spatially corresponding 8 pixels by 8 pixels of u and v, the two color components. Further, a macroblock includes four luminance blocks and the two spatially corresponding color difference blocks. Each luminance or chrominance block relates to 8 pixels by 8 pixels of y, u or v. A more detailed description is contained in Document LBC-95-251 of the International Telecommunication Union Telecommunication Standardization Sector Study Group 15 entitled "Draft Recommendations H.263 (Video coding for low bitrate communication)", contact Karel Rijkse, Tel: +31 70 332 8588; the Draft Recommendations H.263 (Video coding for low bitrate communication) is herein incorporated by reference in its entirety.

Figure 2:
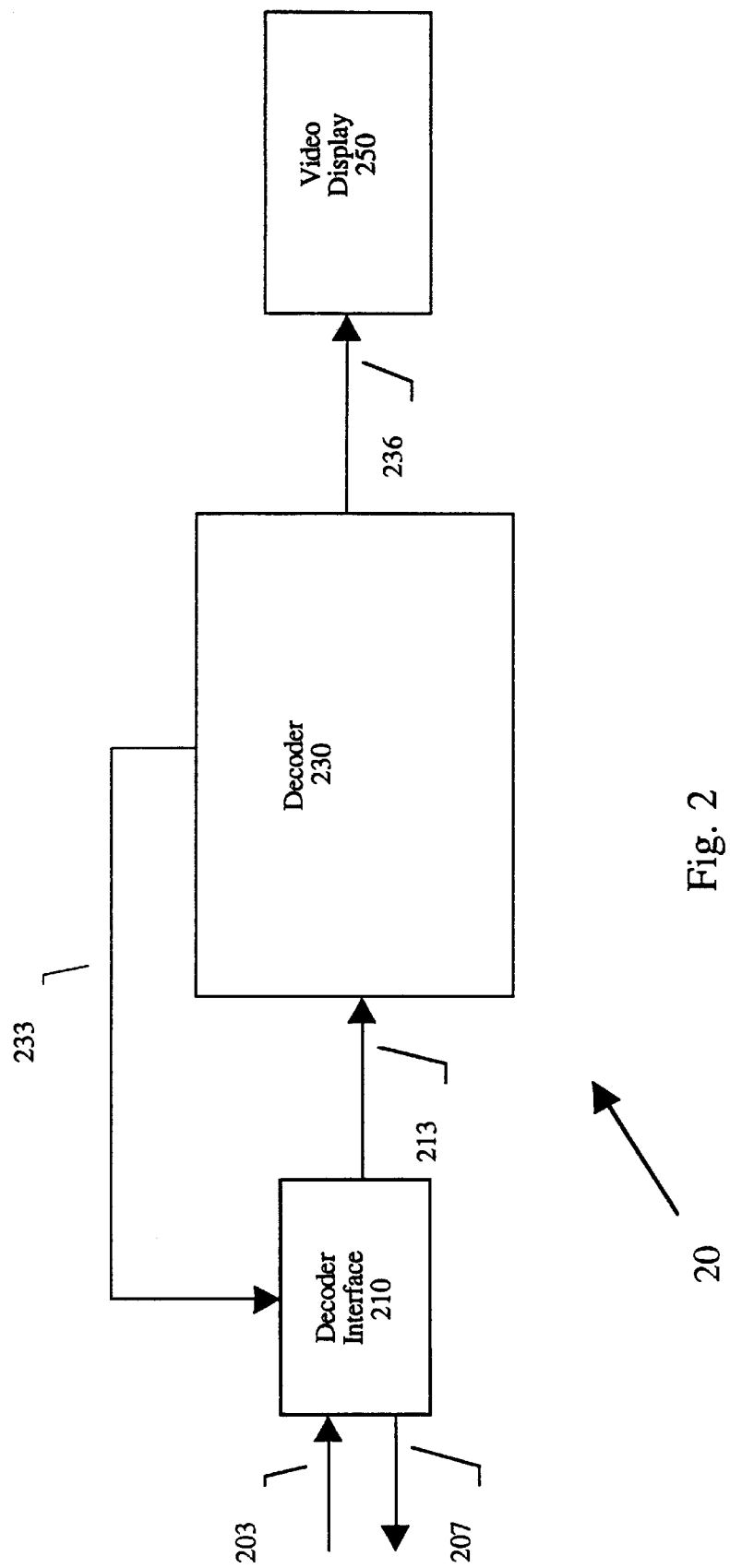
FIG. 2 illustrates a block diagram of a video decoding system.

FIG. 2 shows a block diagram of a video decoding system 20 for decoding of a compressed bit stream according to the present invention. The video decoding system 20 includes a decoder interface control/demultiplexer 210, a decoder 230, and a video display 250. The control/demultiplexer 210 includes resources for comparing a locally generated cyclic redundancy check (CRC) with a received CRC of bitstream data received on line 203. If an error is detected from comparison of the locally generated CRC with the received CRC, the control/demultiplexer 210 requests a retramission request on line 207. If no error is detected, the bitstream data is transferred to the decoder 230 on line 213. The decoder 230 includes resources which decodes the bitstream data. The decoder 230 is described in U.S. Letters patent application Ser. No. 08/618,847 entitled "A Method Of Lossy Decoding Of Bitstream Data" filed Mar. 20, 1996 and is herein incorporated by reference. The decoder 230 provides display data on line 236 for the video display 250.

The decoder 230 includes resources for repairing errors in the bitstream data. When the decoder 230 determines an erred image that cannot be decoded, the decoder 230 issues an update request on line 233 to the decoder interface 210. Depending on the severity of the errors, the decoder 230 requests an update of an entire image or a portion of the image found to be in error. The decoder control/demultiplexer 210 transfers a decoder update request on line 207 to a video encoder.

Figure 3:
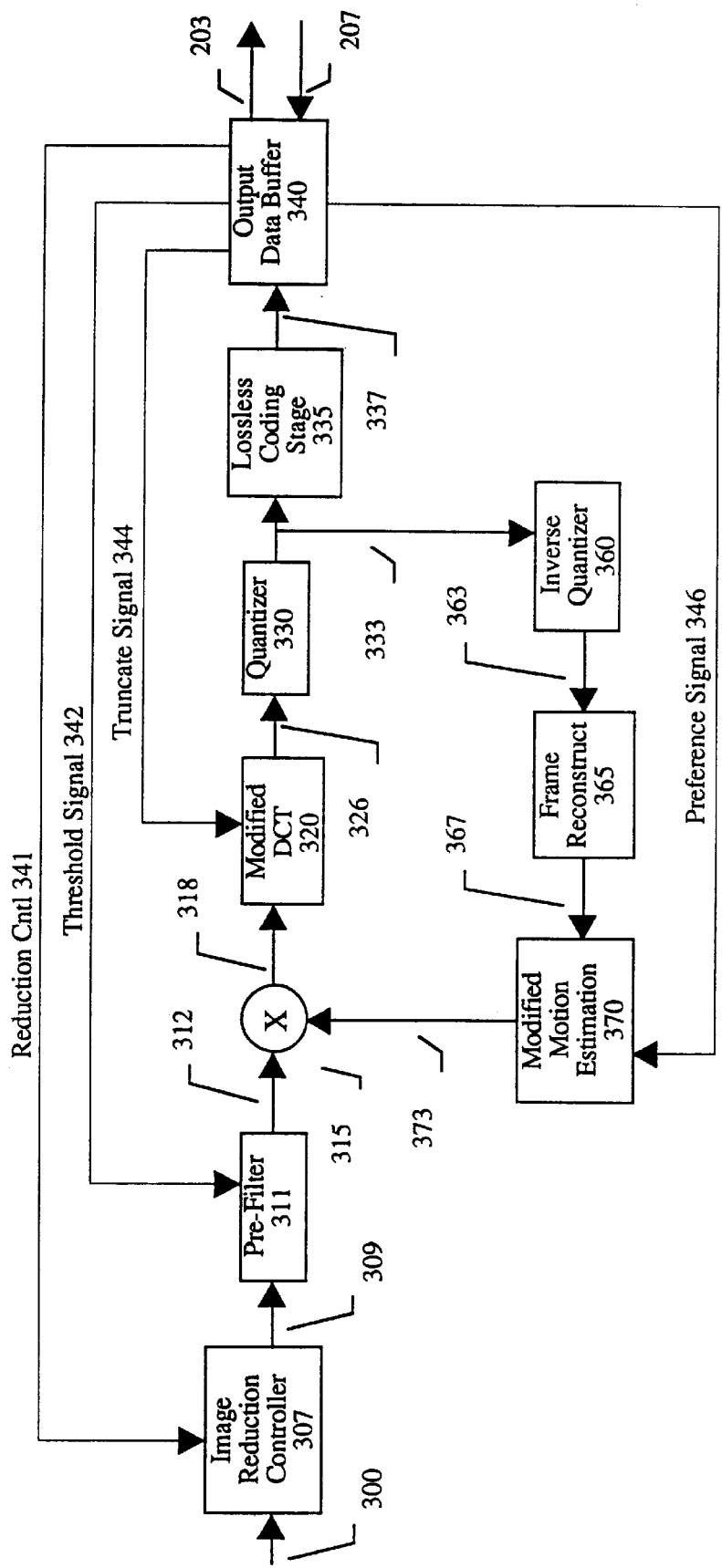
FIG. 3 illustrates a block diagram of a video encoder in accordance to the present invention.

FIG. 3 shows a block diagram of a video encoder 30 in accordance to the present invention. The video encoder 30 includes an image reduction controller 307, pre-filter 311, a subtractor 315, modified DCT 320, quantizer 330, inverse quantizer 360, frame reconstruct 365, modified motion estimation 370, lossless coding stage 335, and output data buffer 340. The image reduction controller 307 receives yuv data blocks on line 300 and provides image size reduction of the incoming yuv data blocks on line 309. Pre-filter 311 receives the yuv data blocks from the image reduction controller 307 and provides filtered yuv data blocks on line 312 to the subtractor 215. The subtractor 315 subtracts motion estimation predicted data blocks from modified motion estimation block 370 on line 373 and the filtered yuv data blocks on line 312. Modified DCT 320 receives the output of subtractor 315 on line 318 and provides modified DCT data blocks on line 326. Quantizer 230 receives the modified DCT data blocks on line 326 and provides quantizer data blocks on line 333. The lossless coding stage 335 and the inverse quantizer 360 receives the quantizer data blocks on line 333. The inverse quantizer 360 provides inverse quantizer data blocks on line 263. The frame reconstruct block 365 receives the inverse quantizer data blocks and provides frame reconstruct data on line 367. The modified motion estimation block 370 receives the frame reconstruct data and provides the motion estimation predicted data blocks on line 373

The lossless coding stage 335 receives the quantizer data blocks on line 333 and provides lossless coded data blocks on line 337. Output data buffer 340 receives the lossless coded data blocks and provides the lossless compressed data on line 203 to the video decoding system 20. The output data buffer 340 also receives the decoder update request on line 207 from the decoding system 20. In response to the decoder update request, the output data buffer 340 provides reduction control signal on line 341 to the image reduction controller 307, threshold signal on line 342 to the pre-filter component 311, truncate signal on line 344 to the modified DCT 320, and preference signal on line 346 to the modified motion estimation block 370. The reduction control signal on 341, the threshold signal on line 342, the truncate signal on line 344, and the preference signal on line 346 alter parameters to its respective encoder component so that encoded data bits of incoming images are reduced to accommodate increased data bits associated with the update request.

For example, as the image reduction controller 307 receives incoming images in the form of yuv data blocks on line 300, the reduction control signal on line 341 directs the image reduction controller 307 to reduce the image size of the incoming image data blocks. Although transmitted image sizes are reduced, the decoder 230 of the video decoding system 20 interpolates these reduced size images up to full size from previous full size images for display. Reducing the number of image data frames and the image size reduce the amount of encoded data.

Figure 4:
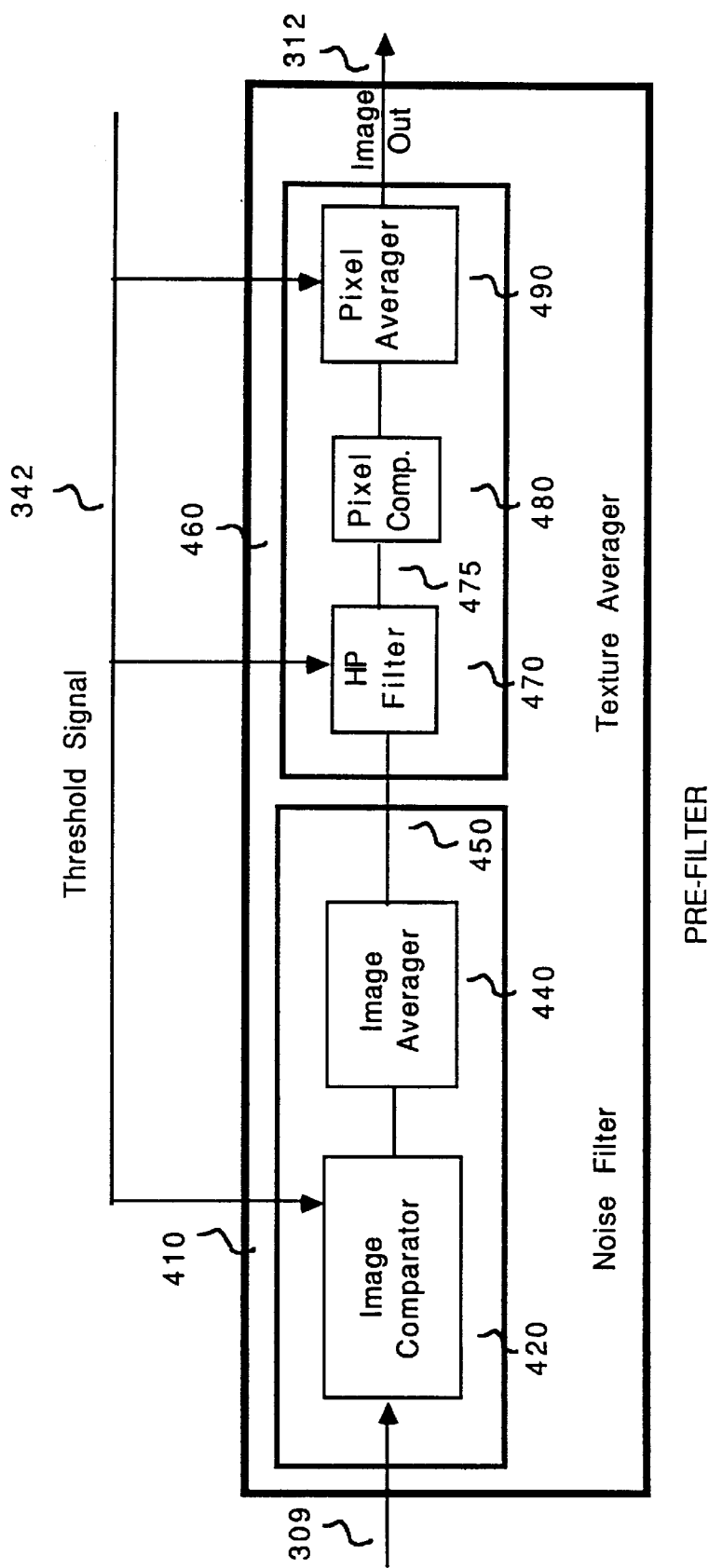
FIG. 4 illustrates a block diagram of the pre-filter component of the video encoder.

FIG. 4 shows a block diagram of the pre-filter component 311 of the video encoder 30. The pre-filter component 311 includes a noise filter 410 and a texture averager 460. The noise filter 410 filters noise present in the image blocks of the yuv data to reduce the amount of encoded data. The texture averager 460 identifies edges and reduces texture changes in the images of the yuv data to reduce the amount of encoded data.

The noise filter 410 includes an image comparator 420 and an image averager 440. The image comparator 420 receives the yuv data on line 309 and determines differences between a first image and a second image of the yuv data. Noise components of the images represent changes between the first image and the second image. The image comparator 420 computes the absolute value of the differences between a first image and a second image. The image comparator 420 also receives a threshold signal on line 342 which sets a threshold value for an absolute value difference between the first image and the second image. If the difference between the comparison of the first image and the second image from the image comparator is less than the threshold value, then the image comparator 420 signals the image averager 440 that this area in the images is to be averaged. The image averager 440 receives the first image and the second image from the image comparator 420 and averages the images to provide an averaged image for output on line 450. The averaged image from the image averager 440 affords images having reduced noise components. Images having reduced noise components offer more efficient coding of the images and reduce the amount of encoded data.

The texture averager 460 includes a high pass filter 470, pixel comparator 480, and a pixel averager 490. The high pass filter 470 receives the averaged image from the image averager 440 on line 450 and the threshold signal on line 342. The threshold signal provides the high pass filter 470 with a high pass threshold value. The high pass threshold value determines the filtering characteristics of the high pass filter. As the averaged image pass through the high pass filter 470, the high pass filter 470 identifies areas of the averaged image having a high rate of change and provides filtered data on line 475. The areas of high rate of change include areas having many data bits which signifies edges and textures in the image. Thus, the high pass filter identifies the edges and textures in the image.

The pixel comparator 480 receives the filtered data on line 475 and identifies the pixels of the edges and textures to average. The pixel comparator 480 determines the absolute value of the difference between the pixels of the edges and textures. The pixel averager 490 receives the absolute value of the difference between the pixels from the pixel comparator 480 and the threshold signal on line 342. The threshold signal on line 342 determines a threshold value for the pixel averager 490. As the pixel averager 490 receives the absolute value of the difference between the pixels of the edges and textures from the pixel comparator 480, the pixel averager 490 averages pixels of the edges and textures when the absolute value of the difference between the pixels is greater than the threshold value.

The pixel averager 490 reduces texture and edge changes associated with an image to reduce image data. The pixel averager 490 provides image out data on line 312 which provides the output for the texture averager 460. Thus, the texture averager 460 reduces the data bits associated with edges and textures of an image. Reducing the data bits associated with edges and textures of the image reduces the data rate of the image data entering the integrator 215.

Figure 5:
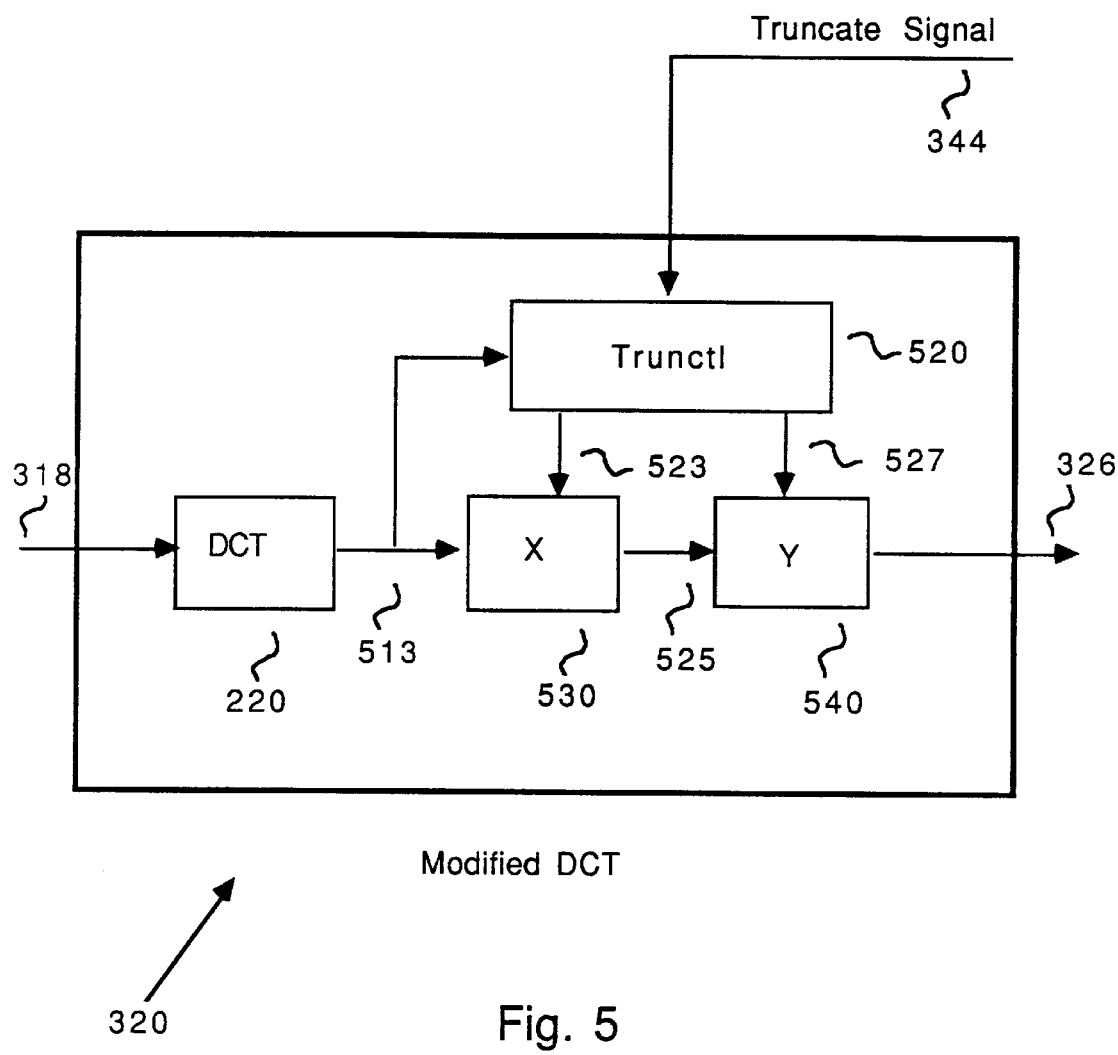
FIG. 5 illustrates a block diagram of the modified DCT block of the video encoder.

FIG. 5 shows a block diagram of the modified DCT block 320 of the video encoder 30. The modified DCT block 320 includes the DCT block 220, truncate controller 520, x-truncator 530, and y-truncator 540. The DCT 220 receives data blocks of n×n on line 318 and performs DCT transform on the n×n blocks of data. The output of DCT block 220 provides DCT coefficients for the n×n blocks of data having x-coordinate data and y-coordinate data on line 513. The truncate controller 520 and the x-truncator 530 receives the DCT coefficients on line 513. The truncate controller 520 receives truncate signal on line 344 which controls the degree of truncation performed by the truncate controller 520.

The truncate controller 520 includes circuitry which determines the extent of the truncation of the DCT coefficients in response to the received DCT coefficients on line 513 and the truncate signal on line 344. The truncate controller 520 provides an x-truncate signal on line 523 to truncate x-coordinate data of the n×n blocks of data. The x-truncator 530 passes the truncated x-coordinate data of the n×n blocks of data on line 525 to the y-truncator 540.

As the y-truncator 540 receives the truncated x-coordinate data on line 525, the truncate controller 520 provides a y-truncate signal on line 527 to truncate y-coordinate data of the n×n blocks of data. The y-truncator 540 provides truncated x-coordinate data and truncated y-coordinate data on line 326. The truncated n×n blocks of data provide the output for the modified DCT block 320.

The x-truncator 530 and the y-truncator 540 substitute zeros for the DCT x-coordinate and y-coordinate coefficients, respectively. The DCT coefficients provides detail and texture information for the encoded images. Truncating the DCT coefficients that provide high detail and texture with zeros reduces the amount of encoded data bits. Furthermore, substituting zeros for DCT coefficients embed Q in the transform which controls the number of zeros explicitly during quantizing by the quantizer 230. Increasing the number of zeros during quantizing reduces the amount of encoded data bits.

According to another embodiment of the modified DCT block 320, the truncate controller 520 includes circuitry that sorts the DCT coefficients according to the magnitude of the DCT coefficients. In the present embodiment, there are a total of 64 coefficients possible non-zero DCT coefficients resulting from the 8×8 blocks of data. As the DCT coefficients are sorted according to magnitude, the truncate signal on line 344 provides a truncate number that determines the number of DCT coefficients which are retained out of the possible 64 coefficients. The remainder of the DCT coefficients that are not retained is set to zero. Accordingly, the amount of encoded data bits is reduced by reducing the number of DCT coefficients while the bulk of the detail and texture information contained with the DCT coefficients having the greatest magnitude for the n×n blocks of data are retained.

Figure 6:
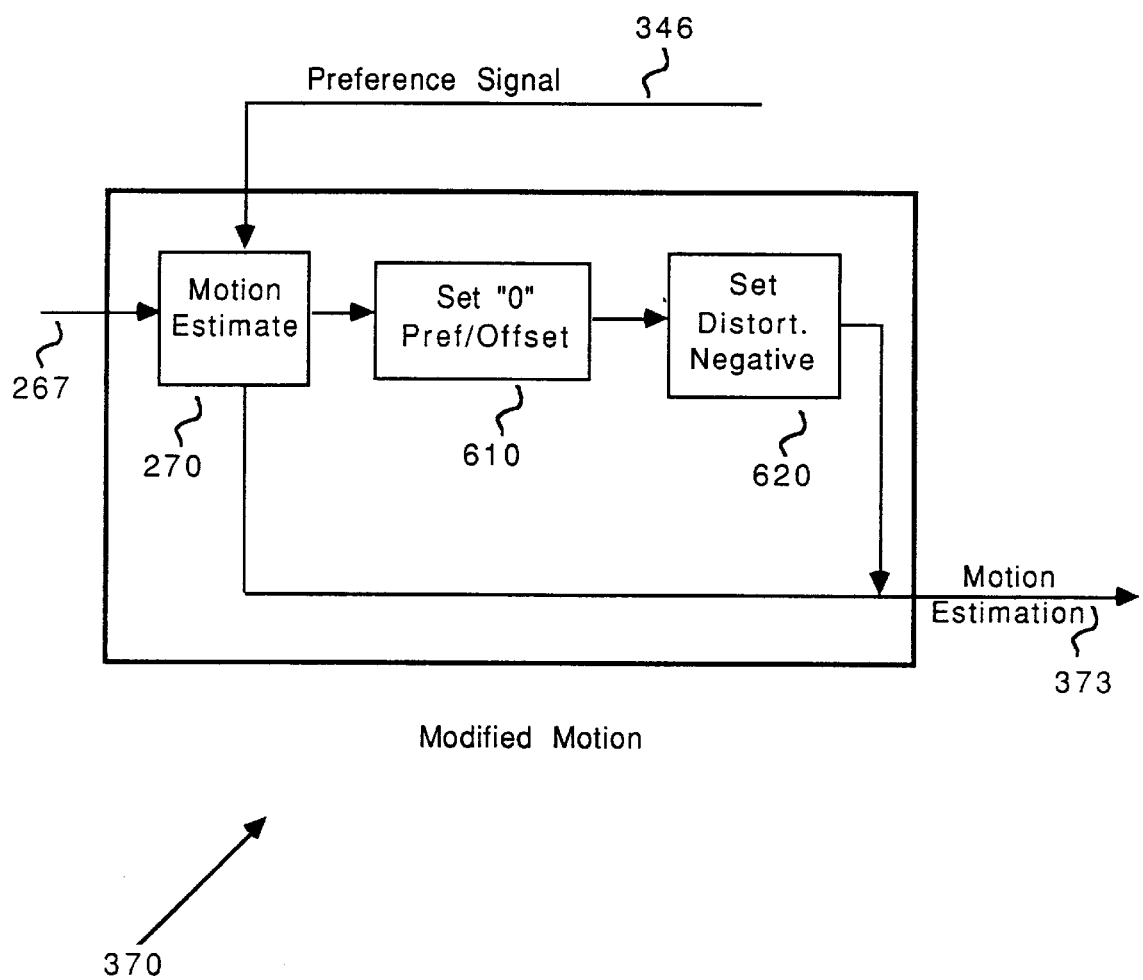
FIG. 6 illustrates a block diagram of the modified motion block of the video encoder.

FIG. 6 shows a block diagram of the modified motion block 370 of the video encoder 30. The modified motion block 370 includes the motion estimation block 270, set preference/offset block 610, and set distortion negative block 620. The motion estimation block 270 receives data blocks on line 267 for motion estimation and the preference signal on line 346. When the preference signal on line 346 becomes active, the motion estimation block 270 directs its output to the set preference/offset block 610, else the output is directed to line 373. The set preference/offset block 610 attaches the preference to the motion vector to zero vector and passes the data blocks to the set distortion negative block 620. The set distortion negative block 620 sets a negative distortion value for the motion estimation and passes the result to line 373.

Attaching preference to zero vector causes the zero motion vector to be chosen in preference to non zero motion vectors which greatly reduces the amount of time and data bits required to perform the motion estimation. Furthermore, setting the distortion value to a negative number avoids additional searching and computation for the motion vector because the distortion value is always a positive number under normal motion estimation mode. Thus, in response to the preference signal on line 346, the motion estimation block 270 directs the motion estimation to line 373 for output or to the set preference/offset block 610. When the preference signal on line 346 becomes active, the modified motion estimation block 370 operates in motion estimation compression mode which reduces the amount of encoded data bits.

Figure 7:
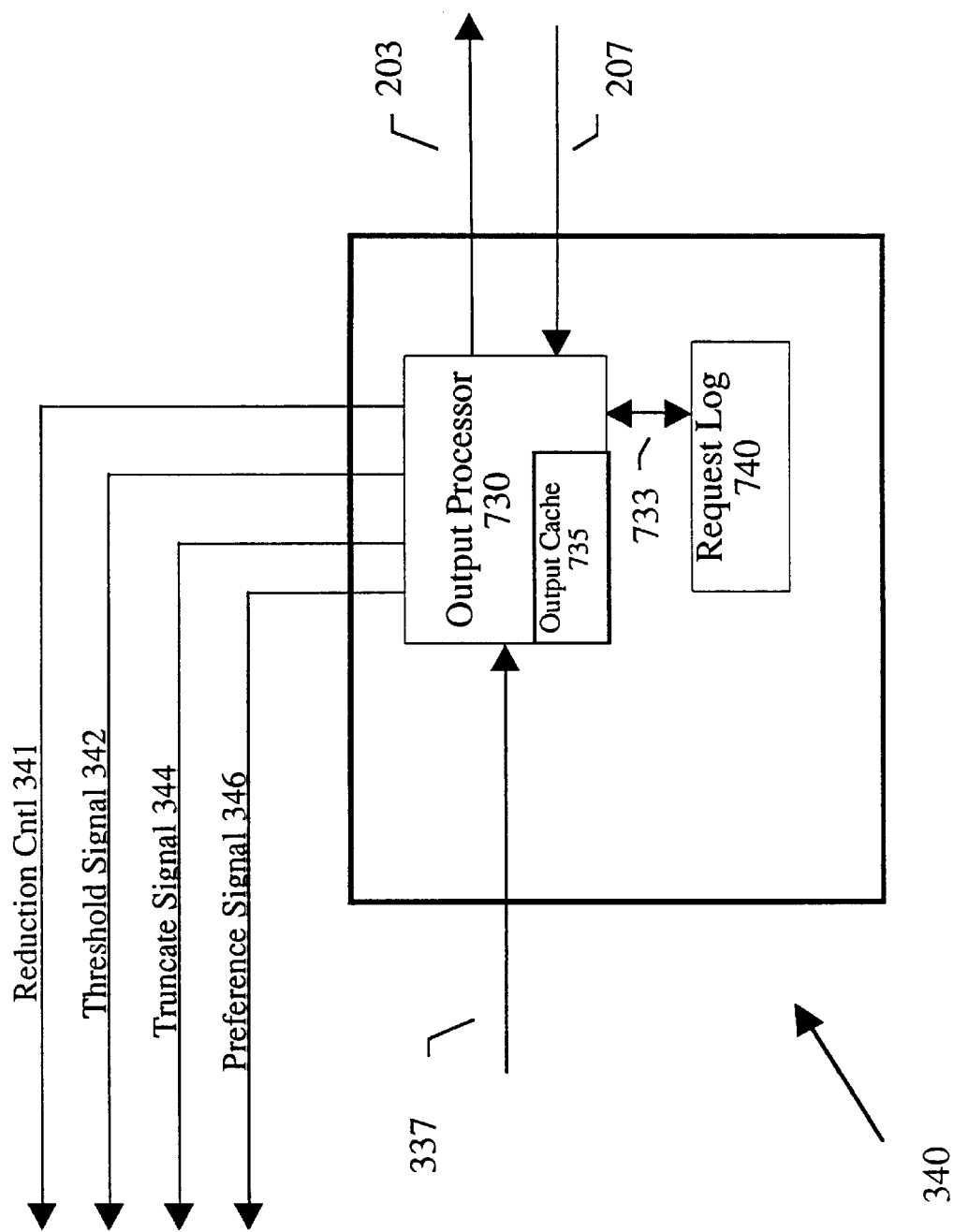
FIG. 7 illustrates a block diagram of the output data buffer of the video encoder.

FIG. 7 shows a block diagram of the output data buffer 340 of the video encoder 30. The output data buffer 340 includes an output processor 730, an output cache 735, and a request log 740. The output processor 730 receives lossless encoded data blocks on line 337 and provides the lossless compressed data on line 203. The output processor 730 includes circuitry which handshakes with the decoding system 20 and receives the update requests on line 207. An update request directs retransmission of an entire image or a portion of an image from the video encoder 30. In response to the update requests, the output processor 730 first checks the output cache 735 for the requested image. The output processor 730 also predicts data rate consequences of the update request based on statistics from previously transmitted similar images. The output processor 730 issues the reduction control signal on line 341, the threshold signal on line 342, the truncate signal on line 344, or the preference signal on line 346 in order to reduce encoded data so that a particular bit rate target is achieved while servicing the update request. Often times update requests entail transmission of an intra frame that contains full scene information. Intra frames contain substantially more encoded data than the inter frames which contain motion data. The output processor 730 reduces the amount of encoded data so that update requests from the decoding system 20 cause less disruption to the decoded image. This translates to smoother and higher frame rate displays of a decoded image.

The request log 740 provides a data base of the number of update requests from the decoding system 20. The output processor 730 logs update requests to the request log 740 on line 733. In instances of repeated update requests where a threshold number for repeated update requests is obtained, the output processor 730 performs strategies that reduce the number of update requests. The output processor 730 negotiates with the decoding system 20 to reduce image size of the encoded data. Reducing the image size reduces the amount of encoded data. Similarly, the output processor 730 negotiates with the decoding system 20 to reduce the transmission data rate. Reducing the transmission data rate also reduces the amount of encoded data to the decoding system 20. Moreover, if the update requests persist at the threshold number, the output processor 730 transmits pre-filtered intra frames until the frequency of update requests drops below the threshold number.

The output processor 740 controls the various parameters of the video encoder 30 and provides updates to image areas that have been found to be in error without exceeding a particular bit rate target during transmission of the lossless compressed data. Maintaining a particular bit rate target affords increased efficiency for the transfer of the lossless compressed data, improved decoding of the lossless compressed data, and better image quality at the display.

While the foregoing detailed description has described several embodiments of the apparatus and methods for an intelligent codec system in accordance with this invention, it is to be understood that the above description is illustrative only and not limiting of the disclosed invention. Obviously, many modifications and variations will be apparent to the practitioners skilled in this art. Accordingly, the apparatus and methods for an intelligent codec system have been provided. The intelligent codec system predicts bit rate consequences of update requests and preprocesses incoming images to reduce the amount of compressed data so that the transmission data rate including the update request images maintains a particular target rate.

What is claimed is:

1. A video encoder for encoding input images having a plurality of data blocks to provide compressed image data comprising:

DCT (discrete cosine transformer) resources having a truncate controller configured to receive a truncate signal to truncate the data blocks to provide reduced data blocks;

quantizing resources coupled to the DCT resources to quantize the reduced data blocks to provide quantized data blocks;

inverse quantizing resources coupled to the quantizing resources to inverse quantize the quantized data blocks;

frame reconstruction resources coupled to the inverse quantizing resources to reconstruct previous compressed frames;

motion estimation resources coupled to the frame reconstruction resources to provide predicted data blocks;

subtraction resources coupled to the DCT resources and the motion estimation resources to subtract the data blocks and the predicted data blocks; and an output data buffer coupled to the quantizing resources and the inverse quantizing resources configured to provide the compressed image data and respond to update requests of previous compressed image data while maintaining a particular target output of compressed image data rate.

2. The video encoder of claim 1, wherein the output data buffer includes an output buffer configured to predict output image data rate consequences from providing the previous compressed image data.

3. The video encoder of claim 2, wherein th e output data buffer includes an output processor which maintains a particular target output of compressed image data rate.

4. The video encoder of claim 3 further comprises pre-filtering resources coupled to the subtraction resources and the output processor to pre-filter the data blocks in response to the output processor for reducing the compressed image data rate.

5. The video encoder of claim 3 further comprises modified DCT resources coupled to the subtraction resources, quantizing resources, and the output processor to pre-quantize DCT coefficients of the data blocks in response to the output processor for reducing the compressed image data rate.

6. The video encoder of claim 3 further comprises modified motion estimation resources coupled to the subtraction resources, frame reconstruct resources, and the output processor to set motion estimation preference of the data blocks in response to the output processor for reducing the compressed image data rate.

7. The video encoder of claim 3, wherein the output processor includes logging resources which logs the update requests.

8. The video encoder of claim 7, wherein the output processor in response to repeated update requests reduces the output image data rate.

9. The video encoder of claim 8 further comprising pre-filtering resources configured to pre-filter intra-frames and wherein the output processor includes resources which provide a pre-filter intra frame signal to the pre-filtering resources to provide a pre-filtered intra frame.

10. A method of encoding input images having a plurality of data blocks to provide output image data comprising the steps:

truncating DCT (discrete cosine transformer) data blocks to provide reduced data blocks in response to a truncate signal;

quantizing the reduced data blocks to provide quantized data blocks;

inverse quantizing the quantized data blocks to provide inverse quantized data blocks;

frame reconstructing to provide a previous compressed frame;

motion estimating to provide predicted data blocks;

integrating the data blocks and the predicted data blocks;

interfacing with a decoder to provide intra coded output image data in response to decoding errors from the decoder; and maintaining a particular target data rate while providing the intra coded output image data.

11. The method of encoding input images according to claim 10, wherein the step of interfacing includes negotiating with the decoder to provide smaller images of output image data.

12. The method of encoding input images according to claim 10, wherein the step of interfacing includes reducing output image data rates to the decoder.

13. The method of encoding input images according to claim 12 wherein the step of reducing output image data rates includes truncating DCT coefficients of the data blocks.

14. The method of encoding input images according to claim 10, wherein the step of interfacing includes logging decoding errors from the decoder to determine an error threshold.

15. The method of encoding input images according to claim 14 further comprising the step pre-filtering intra-coded image data for output to the decoder until decoding errors falls below the error threshold.

* * * * *